United States Patent [19]

Furukawa et al.

[11] Patent Number: 4,607,328
[45] Date of Patent: Aug. 19, 1986

[54] DATA TRANSFER APPARATUS FOR A MICROCOMPUTER SYSTEM

[75] Inventors: Shunsuke Furukawa, Tokyo; Kenji Yamamoto, Kashiwa, both of Japan

[73] Assignee: Sony Corporation, Tokyo, Japan

[21] Appl. No.: 410,911

[22] Filed: Aug. 24, 1982

[30] Foreign Application Priority Data

Aug. 24, 1981 [JP] Japan .................. 56-132487

[51] Int. Cl.⁴ ............................................. G06F 13/00
[52] U.S. Cl. .................................................... 364/200
[58] Field of Search ............................. 364/200, 900

[56] References Cited

U.S. PATENT DOCUMENTS

| | | | |
|---|---|---|---|
| 3,559,187 | 1/1971 | Figueroa et al. | 364/200 |
| 4,158,235 | 6/1979 | Call et al. | 364/900 |
| 4,166,289 | 8/1979 | Murtha et al. | 364/200 |
| 4,210,959 | 7/1980 | Wozniak | 364/200 |
| 4,268,906 | 5/1981 | Bourke et al. | 364/200 |
| 4,357,657 | 11/1982 | Fellinger | 364/200 |
| 4,365,294 | 12/1982 | Stokken | 364/200 |

FOREIGN PATENT DOCUMENTS

| | | |
|---|---|---|
| 2007890A | 2/1971 | United Kingdom . |
| 1225252 | 3/1971 | United Kingdom . |
| 1428704 | 3/1976 | United Kingdom . |
| 1547383 | 6/1979 | United Kingdom . |
| 1526583 | 3/1980 | United Kingdom . |

OTHER PUBLICATIONS

Hoeppner, *Interface a Floppy-Disk Drive to an 8080A-Based Computer*, May 1980, Byte Publications, pp. 72-98.

*Primary Examiner*—Gareth D. Shaw
*Assistant Examiner*—Daniel K. Dorsey
*Attorney, Agent, or Firm*—Lewis H. Eslinger; Alvin Sinderbrand

[57] ABSTRACT

Apparatus for rapidly transferring data between a central processing unit (CPU) of microcomputer apparatus and floppy disc drives, includes a floppy disc controller for interfacing the floppy disc drives with the CPU and generating an interrupt request status signal indicating whether a command has been executed and a data request status signal indicating whether data is to transferred between the floppy disc controller and the CPU, the CPU generating command signals in response to these status signals; a data bus connecting the CPU to data access lines of the floppy disc controller; a bidirectional buffer interposed between the data bus and the data access lines for gating the data between the floppy disc controller and the CPU through the data bus and for gating the interrupt request status signal and data request status signal through the data bus to the CPU in response to gating signals; first and second gate circuits for gating the status signals to the buffer in response to the gating signals; a NOR gate for supplying gating signals to enable the buffer in response to the command signals; and an OR gate for supplying gating signals to enable the first and second gate circuits in response to the command signals, whereby rapid data transfer is achieved without using a direct memory access controller.

10 Claims, 2 Drawing Figures

DATA TRANSFER APPARATUS FOR A MICROCOMPUTER SYSTEM

BACKGROUND OF THE INVENTION

1. Field of the Invention

This invention relates generally to data transfer apparatus and, more particularly, is directed to apparatus for transferring data between microcomputer apparatus and a floppy disc controller of a floppy disc system.

2. Description of the Prior Art

Generally, in microcomputer systems, data transfers between an external memory, such as a floppy disc, and a main memory of microcomputer apparatus must pass through the central processing unit (CPU) of the microcomputer apparatus, and therefore, must be implemented in the software of the system. This normally involves the execution of a detailed instruction sequence for inputting, outputting and tracking each byte of data in a block to be transferred, whereby transfer of data occurs one byte at a time. As a result, CPU transfers are relatively slow and tie up the CPU for long periods of time.

Therefore, when using a floppy disc system with microcomputer apparatus, it is desirable to transfer data rapidly between a floppy disc controller of the floppy disc system and the main memory of the microcomputer apparatus. In order to achieve such rapid transfer, direct memory access (DMA) controllers are conventionally used to perform direct transfers of data between the floppy disc controller and the main memory of the microcomputer apparatus, without going through the CPU and without the instruction fetches required by the CPU. In other words, all of the data transfer is performed through hardware of the DMA controller. As a result, DMA transfer of data requires relatively complex circuitry, whereby the entire system becomes rather large and expensive.

OBJECTS AND SUMMARY OF THE INVENTION

Accordingly, it is an object of this invention to provide data transfer apparatus that avoids the above-described difficulties encountered with the prior art.

More particularly, it is an object of this invention to provide data transfer apparatus in which data is rapidly transferred between a floppy disc controller of a floppy disc system and the main memory of microcomputer apparatus without the use of a DMA controller.

It is another object of this invention to provide data transfer apparatus in which status signals of the floppy disc controller of a floppy disc system are transferred by data lines to a CPU of microcomputer apparatus to provide rapid transfer of data between the floppy disc controller and the main memory of the microcomputer apparatus without the use of a DMA controller.

In accordance with an aspect of this invention, apparatus is provided for transferring data between external memory means and microcomputer means through data bus means, the apparatus including external memory control means for interfacing the microcomputer means and the external memory means, the external memory control means generating at least one status signal; gate means for gating the at least one status signal through the data bus means to the microcomputer means and for gating the data between the microcomputer means and the external memory control means through the data bus means, the microcomputer means generating at least one command signal in response to the at least one status signal; and gate control means for enabling the gate means to gate the at least one status signal to the microcomputer means and to gate the data between the microcomputer means and the external memory control means through the data bus means in response to the at least one command signal.

The above, and other, objects, features and advantages of the invention will become apparent from the following detailed description of an illustrative embodiment of the invention which is to be read in connection with the accompanying drawings.

DETAILED DESCRIPTION OF A PREFERRED EMBODIMENT

Figure 1:
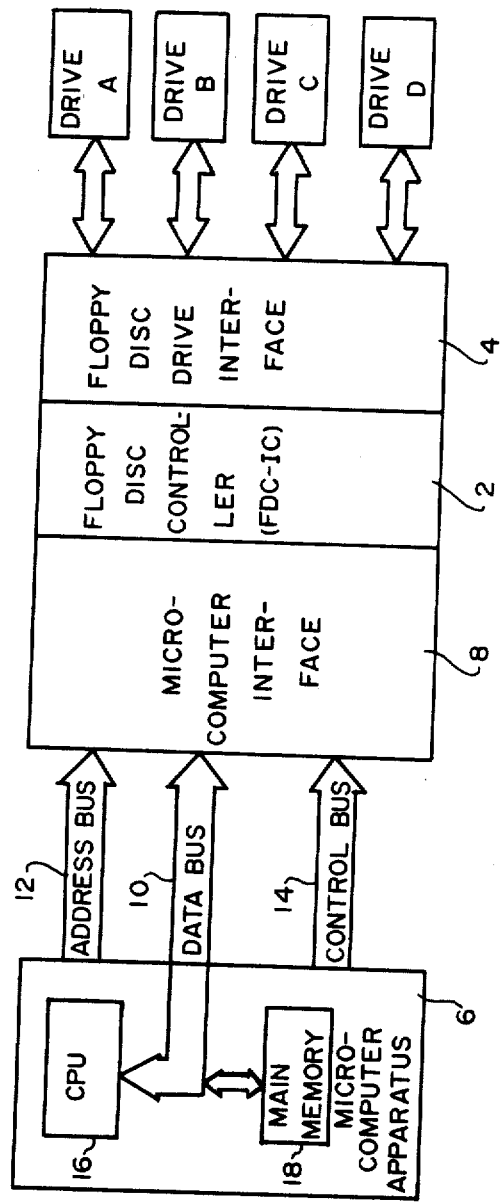
FIG. 1 is a block diagram of data transfer apparatus according to one embodiment of the present invention.

Referring to the drawings in detail, and initially to FIG. 1 thereof, a plurality of floppy disc drives A–D are provided for storing data. The floppy disc drives A–D are controlled by a floppy disc controller 2 through a floppy disc drive interface 4, floppy disc controller 2 generally being formed as an LSI chip. For example, an MB8876 chip by Fujitsu or an equivalent IC chip may be employed for floppy disc controller 2. Floppy disc controller 2 generates various signals for data management and disc drive control, and also generates status information, as will be discussed in greater detail hereinafter. Floppy disc drive interface 4 separates data and clock signals, and decodes the drive and side select signals.

Floppy disc controller 2 is connected to a host computer or microcomputer apparatus 6 through a microcomputer or host computer interface 8 and data, address and control buses 10, 12 and 14, respectively. Data bus 10 is connected to a central processing unit 16, and a main memory 18, such as a random access memory (RAM), of microcomputer apparatus 6 is also connected to data bus 10. As an example, a Z80A-CPU from Zilog, Inc. can be used for CPU 16. Generally, CPU 16 controls floppy disc controller 2 according to given commands, as will be discussed in greater detail hereinafter.

Figure 2:
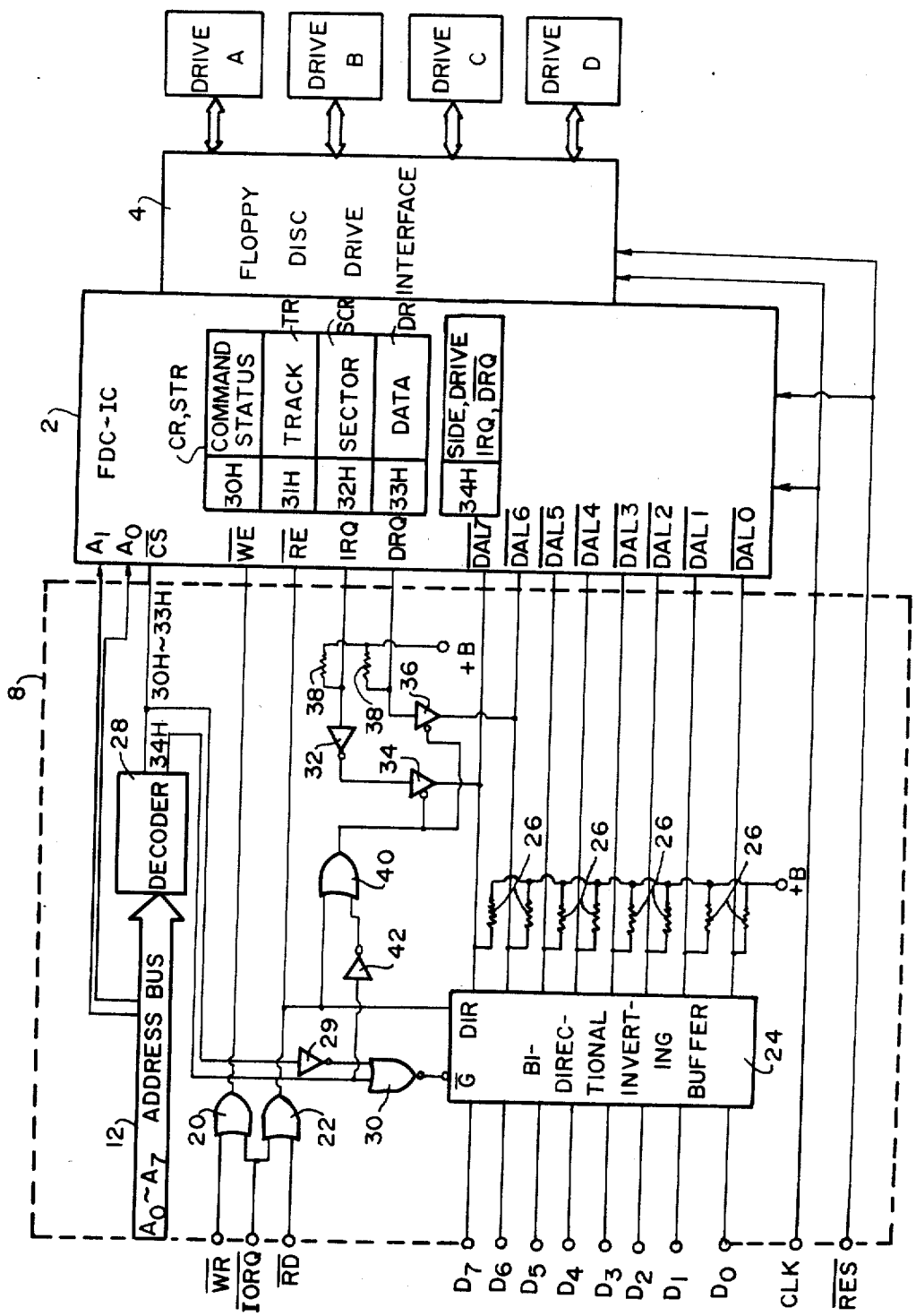
FIG. 2 is a more detailed block diagram of a portion of the apparatus of FIG. 1.

Referring now to FIG. 2, a more detailed description of a portion of the apparatus of FIG. 1 will now be described. In particular, microcomputer apparatus 6 is connected to microcomputer interface 8 by data bus 10 comprised of data lines $D_0$–$D_7$, address bus 12, and control bus 14 comprised of a memory write line $\overline{WR}$, an I/O request line $\overline{IORQ}$, a memory read line $\overline{RD}$, a clock line CLK, and a reset line $\overline{RES}$. I/O request line $\overline{IORQ}$ goes low to indicate that the lower byte $A_0$–$A_7$ of address bus 12 holds a valid I/O port address for an I/O read or write operation, and memory read and memory write lines $\overline{RD}$ and $\overline{WR}$ are also active when low. Memory read line $\overline{RD}$ indicates that the microcomputer apparatus wants to read data from memory or an I/O device, while memory write line $\overline{WR}$ indicates that the data bus holds data to be stored in an address location. The signal from memory write line $\overline{WR}$ from microcomputer apparatus 6 is supplied to one input of a two-input OR gate 20 of microcomputer interface 8, the other input of which is supplied with the signal from I/O request line $\overline{IORQ}$. OR gate 20, in turn, supplies a write enable signal $\overline{WE}$ to a write enable terminal $\overline{WE}$ of floppy disc controller 2 and which is used as a strobe when data is written into the internal registers of floppy disc controller 2. In like manner, the signal from memory read line $\overline{RD}$ is supplied to one input of an OR gate 22 of microcomputer interface 8, the other input of which is supplied with the signal from I/O request line $\overline{IORQ}$ and which, in turn, supplies a read enable signal $\overline{RE}$ to a read enable terminal $\overline{RE}$ of floppy disc controller 2 and also for use as a strobe when data is read from the internal registers of floppy disc controller 2. In this manner, enable signals $\overline{RE}$ and $\overline{WE}$ are supplied to floppy disc controller 2 for controlling the reading and writing of data with respect to floppy disc drives A–D. The remaining signals from control lines CLK and $\overline{RES}$ are supplied directly through microcomputer interface 8 to both floppy disc controller 2 and floppy disc drive interface 4.

Microcomputer interface 8 also includes a bidirectional inverting buffer 24 connected between data lines $D_0$–$D_7$ of data bus 10 and data access lines $\overline{DAL0}$–$\overline{DAL7}$ of floppy disc controller 2 for gating data between microcomputer apparatus 6 and floppy disc controller 2. In this regard, bidirectional inverting buffer 24 includes a gate input terminal $\overline{G}$ for enabling bidirectional inverting buffer 24 to gate data therethrough in response to a gate signal supplied to gate input terminal $\overline{G}$, and a directional control terminal DIR for controlling the direction of gating of data between microcomputer apparatus 6 and floppy disc controller 2 in response to read enable signal $\overline{RE}$ from the output of OR gate 22. The gate signal supplied to gate input terminal $\overline{G}$ is produced in response to command or control signals from CPU 16 of microcomputer apparatus 6. It is to be appreciated that the MB8876 floppy disc controller uses negative logic, and accordingly, buffer 24 is of the inverting type. A pull-up resistor 26 is also connected between a power source +B and each data line connecting data access lines $\overline{DAL0}$–$\overline{DAL7}$ of floppy disc controller 2 with bidirectional inverting buffer 24.

In order to control floppy disc controller 2, for example, with the MB8876 floppy disc controller by Fujitsu, the latter is assigned to I/O port addresses 30H–34H of microcomputer apparatus 6, with floppy disc controller 2 including a plurality of registers corresponding to the assigned I/O port addresses 30H–34H. In particular, floppy disc controller 2 includes a command register CR corresponding to I/O port address 30H and which is used during the write mode to set commands for the drive unit control, the commands being written into command register CR when the busy flag of a status register is reset to "0". When the commands are written into command register CR, the status data for floppy disc controller 2 is initialized according to the command contents and each flag therein is set according to the command execution result. When execution of the command is completed, a busy flag is reset to "0". The command signal may include commands to move the recording or reproducing head with respect to the floppy disc being used, commands for reading and writing data, and the like. A status register STR of floppy disc controller 2 also corresponds to I/O port address 30H and the information read from status register STR during the read mode depends on the written command from the command register. For example, the status register may include a plurality of flags indicating whether a head is engaged, whether writing or reading operations are being performed, whether errors exist, and the like.

Floppy disc controller 2 also includes a track register TR corresponding to I/O port address 31H. This register is used to store the number of the track with which the head is positioned. It is to be appreciated that each floppy disc is divided into a plurality of sectors, and accordingly, a sector register SCR of floppy disc controller 2 corresponding to I/O port address 32H stores the number of the sector to be read or written by a command. A data register DR corresponding to I/O port address 33H is also provided for storing data during read and write operations. When a seek command is initiated, which functions to move the head to a specified track and thereby seek out such track, the specified track number is also stored in data register DR.

With regard to I/O port address 34H, a drive/side select register is provided for switching floppy disc drives and selecting the side of the floppy disc in the respective switched floppy disc drive to be recorded or reproduced with. In addition, an IRQ/$\overline{DRQ}$ status register is also provided with respect to I/O port address 34H and stores an interrupt request status signal IRQ and a data request status signal $\overline{DRQ}$. In particular, status signal IRQ is a one-bit signal which is set to "1" when command execution is completed or terminated, and is reset to "0" when status register STR is read or another command is written. Status signal $\overline{DRQ}$ is merely the inverted form of a DRQ flag stored in status register STR. In particular, when data request status signal $\overline{DRQ}$ is set to "0" (DRQ is set to "1"), a data write/read operation is requested, and the $\overline{DRQ}$ signal or flag is reset to "1" when data has been written or read. The IRQ/$\overline{DRQ}$ status register includes eight bits, with the interrupt request status signal IRQ being assigned to the most significant bit (MSB) position, that is, to bit position 7, and the data request status signal $\overline{DRQ}$ being assigned to the next most significant bit position, that is, to bit position 6. It is to be noted that when testing the bit status of the signals IRQ and $\overline{DRQ}$, the remaining bits of the IRQ/$\overline{DRQ}$ status register are always set to "0".

In addition, various signals are supplied to floppy disc controller 2 from microcomputer apparatus 6 through address bus 12, with address bits $A_0$ and $A_1$ being supplied to floppy disc controller 2 as register select signals used for addressing an internal register from among the command register CR, status register STR, track register TR, sector register SCR and data register DR of floppy disc controller 2. The signals from address bus 12 are supplied to a decoder 28 of microcomputer interface 8 which, in turn, produces control signals, for example, a chip enable signal $\overline{CE}$, corresponding to port addresses 30H–33H, chip enable signal $\overline{CE}$ being supplied to a chip select terminal $\overline{CS}$ of floppy disc controller 2 as a chip select signal $\overline{CS}$. When chip select signal $\overline{CS}$="0", floppy disc controller 2 is selected and data access lines $\overline{DAL0}$–$\overline{DAL7}$ are enabled to provide data transfer between floppy disc controller 2 and microcomputer apparatus 6. For example, when address bits $A_7$–$A_0$ are 00110000, 00110001, 00110010 and 00110011, corresponding to port addresses 30H–33H, control enable signal $\overline{CE}$ becomes "0", and is "1" at other times. On the other hand, when chip select signal $\overline{CS}$="1", data is not transferred between microcomputer apparatus 6 and floppy disc controller 2, since data access lines $\overline{DAL0}$–$\overline{DAL7}$ are in a floating condition at such time. Chip enable signal $\overline{CE}$ is also supplied through an inverter 29 to one input of a two-input NOR gate 30 which, in turn, supplies a gate signal to gate input terminal $\overline{G}$ of bidirectional inverting buffer 24 to permit transfer of data between microcomputer apparatus 6 and floppy disc controller 2. It is to be appreciated that when $\overline{CE}$="0", inverter 29 supplies a "1" signal to NOR gate 30 which, in turn, always supplies a "0" signal to gate input terminal $\overline{G}$ to enable buffer 24 to invert and gate the data signals between data access lines $\overline{DAL0}$–$\overline{DAL7}$ and data bus lines $D_0$–$D_7$ of data bus 10. The direction of transfer, as previously described, is controlled by read enable signal $\overline{RE}$ supplied to directional control terminal DIR of bidirectional inverting buffer 24.

In accordance with the present invention, data is rapidly transferred between floppy disc controller 2 and microcomputer apparatus 6 without the use of a DMA controller by checking or testing status signals IRQ and $\overline{DRQ}$ stored in the IRQ/$\overline{DRQ}$ status register, which status signals are supplied from floppy disc controller 2 to CPU 16 through data bus 10. In particular, signal IRQ from floppy disc controller 2 is supplied to an input of a gate circuit 34 through an inverter 32 and signal DRQ from floppy disc controller 2 is supplied directly to the input of a gate circuit 36, the outputs of gate circuits 34 and 36 being connected to the lines connecting data access lines DAL7 and DAL6, respectively, with bidirectional inverting buffer 24. A voltage source +B supplies a high level or "1" signal to the lines connecting floppy disc controller 2 to the inputs of inverter 32 and gate circuit 36, through pull-up resistors 38. It is to be appreciated that gate circuits 34 and 36, when enabled, supply signals $\overline{IRQ}$ and DRQ to bidirectional inverting buffer 24 along the lines connecting data access lines $\overline{DAL7}$ and $\overline{DAL6}$, respectively, with bidirectional inverting buffer 24. As will be appreciated from the discussion hereinafter, when signals $\overline{IRQ}$ and DRQ are supplied to bidirectional inverting buffer 24, $\overline{CS}$="1" so that data access lines $\overline{DAL0}$–$\overline{DAL7}$ are maintained in a floating condition with no data being supplied therefrom. In addition, pull-up resistors 26 supply a high level or logic level "1" signal to bidirectional inverting buffer 24 along the lines connecting data access lines $\overline{DAL0}$–$\overline{DAL5}$ with bidirectional inverting buffer 24. Bidirectional inverting buffer 24, in turn, inverts the signals supplied thereto so as to transmit status signals IRQ and $\overline{DRQ}$ along data lines $D_7$ and $D_6$, respectively, and transmit low level or logic level "0" bits along the remaining data lines of data bus 10 during a test operation.

In order to control gate circuits 34 and 36 of microcomputer interface 8, gate control circuitry is also provided in microcomputer interface 8. As shown in FIG. 2, a control signal is provided by decoder 28 corresponding to address 34H. For example, if bits $A_7$–$A_0$ supplied along address bus 12 are 00110010O, corresponding to address 34H, decoder 28 produces a "1" signal which is supplied to a two-input OR gate 40 through an inverter 42, and read enable signal $\overline{RE}$ from OR gate 22 is supplied to the other input thereof. OR gate 40, in turn, supplies gate control signals to low active input terminals of gate circuits 34 and 36 for enabling these latter circuits to supply status signals IRQ and DRQ to bidirectional inverting buffer 24. The control signal from decoder 28 corresponding to address 34H is also supplied directly to another input of NOR gate 30. Thus, when this control signal equals "1", NOR gate 30 always produces a "0" signal which is supplied to gate input terminal $\overline{G}$ to enable buffer 24 to invert and gate the status signals IRQ and $\overline{DRQ}$ to CPU 16 along data lines $D_7$ and $D_6$, respectively.

The basic operation of the present invention resides in that status signals IRQ and $\overline{DRQ}$ are supplied along data lines $D_7$ and $D_6$, respectively, to CPU 16 for testing the same to determine whether one byte of data is to be transferred between data register DR of floppy disc controller 2 and CPU 16. As previously stated, when chip enable signal $\overline{CE}$ (=$\overline{CS}$)="1", data transfer from or to data access lines $\overline{DAL0}$–$\overline{DAL7}$ is inhibited since data access lines $\overline{DAL0}$–$\overline{DAL7}$ are maintained in a high impedance or floating state. Accordingly, no data is transferred between data register DR and microcomputer apparatus 6. However, during such time, when the control signal from decoder 28 corresponding to address 34H equals "1", the output of inverter 42 which is supplied to OR gate 40 is at a low or "0" level. When microcomputer apparatus 6 provides command signals to floppy disc controller 2 for a read operation, read enable signgal $\overline{RE}$ is also low, and accordingly, gate circuits 34 and 36 are enabled. In this manner, signals $\overline{IRQ}$ and DRQ are supplied, along with the aforementioned logic level "1" bits, to bidirectional inverting buffer 24. At such time, NOR gate 30, in response to the control signal corresponding to port address 34H from decoder 28, supplies a logic level "0" signal to gate input terminal $\overline{G}$ of bidirectional inverting buffer 24 to enable buffer 24 to invert and gate the status signals supplied thereto. Accordingly, status signals IRQ and $\overline{DRQ}$, along with logic level "0" bits, are supplied to CPU 16 for testing.

It is to be appreciated that, during the read mode, for example, if status signal $\overline{DRQ}$="0", this indicates that data register DR is filled with one byte of data to be read by microcomputer apparatus 6. Also, during the write mode, $\overline{DRQ}$="0" indicates that one byte of data is to be read into data register DR. If either condition is satisfied, and if status signal IRQ indicate that the operation has not been completed, CPU 16 sends command signals to floppy disc controller 2 so that chip enable signal $\overline{CE}$ (=$\overline{CS}$)="0" and the control signal from decoder 28 corresponding to address 34H does not equal "1", that is, equals "0". Thus, OR gate 40 supplies a logic level "1" signal for disenabling gate circuits 34 and 36. At the same time, decoder 28 supplies a "1" signal, through inverter 29, to NOR gate 30 which, in turn, supplies a logic level "0" signal to gate input terminal $\overline{G}$ of bidirectional inverting buffer 24. Since chip enable signal $\overline{CE}$ (=$\overline{CS}$)= "0", data access lines $\overline{DAL0}$–$\overline{DAL7}$ are enabled so that one byte of data is inverted and gated between data register DR and CPU 16 through bidirectional inverting buffer 24. In particular, during the read mode, for example, the byte of data gated by buffer 24 is transmitted to a first register of CPU 16 which, in turn, is retransmitted by CPU 16 to a determined location in main memory 18. Then, gate circuits 34 and 36 and gate input terminal $\overline{G}$ are again enabled when $\overline{CE}$ returns to its "1" state and the control signal corresponding to address 34H from decoder 28 assumes its "1" state. In this manner, the status signals are again transmitted to CPU 16 for testing. The above steps continue in the same manner until status signal IRQ indicates that the read operation, for example, of one sector, has been completed.

The following write and read routines may be utilized by CPU 16 for writing and reading data with respect to an MB8876 floppy disc controller 2 and a Z80A-CPU. It is to be appreciated, however, that although only the read routine will be discussed, the operation of the write routine will be readily apparent therefrom.

|  |  | T CYCLES |  |
|---|---|---|---|
| WRITE ROUTINE |  |  |  |
| STSCK: | IN B, (C) | 12 |  |
|  | JR Z, WCOMD | 7 | (12) |
|  | RET M | 5 | (11) |
|  | IN B, (C) | 12 |  |
|  | JP NZ, STSCK | 10 |  |
| WCOMD: | OUT (DDATA), A | 11 |  |
|  | INC DE | 6 |  |
|  | LD A, (DE) | 7 |  |
|  | IN B, (C) | 12 |  |
|  | JP NZ, STSCK | 10 |  |
|  | JP (HL) | 4 |  |
| READ ROUTINE |  |  |  |
| INSTS: | IN B, (C) | 12 |  |
|  | JR Z, RCOMD | 7 | (12) |
|  | RET M | 5 | (11) |
|  | IN B, (C) | 12 |  |
|  | JP NZ, INSTS | 10 |  |
| RCOMD: | IN A, (DDATA) | 11 |  |
|  | LD (DE), A | 7 |  |
|  | INC DE | 6 |  |
|  | IN B, (C) | 12 |  |
|  | JP NZ, INSTS | 10 |  |
|  | JP (HL) | 4 |  |

During the first step [IN B, (C)] of the read routine, status signals IRQ and $\overline{DRQ}$ are supplied along data lines $D_7$ and $D_6$, respectively, to the B register of the Z80A-CPU which thereafter tests these bits by the S flag and Z flag, respectively, by a test program therein. In particular, if status signal DRQ="1" ($\overline{DRQ}$="0"), the Z flag is also equal to "1". As previously stated, this indicates that data register DR is filled with one byte of data to be read by CPU 16. Accordingly, in the next step [JR Z, RCOMD], the program is jumped to a read command sub-routine (RCOMD). On the other hand, if DRQ="0", that is, $\overline{DRQ}$="1", the Z flag is equal to "0" and the program continues to the next step. In the next step, the status signal IRQ is tested by the instruction [RET M] by an S flag program. If status signal IRQ="1", the S flag is also equal to "1", thereby indicating that the read command has been completed and the program returns to the next address in the main program. However, if DRQ=IRQ="0", status signals IRQ and $\overline{DRQ}$ are again written into the B register of the Z80A-CPU by the instruction [IN B,(C)]. At such time, only the Z flag corresponding to status signal $\overline{DRQ}$ is checked. If the Z flag equals "0" (DRQ="0"), the program jumps back to the beginning of the read routine (INSTS) and the above steps are repeated until the Z flag becomes equal to "1" to jump the program to the read command sub-routine (RCOMD). If, in the last step [JP NZ, INSTS] of the (INSTS) sub-routine, it is determined that status signal DRQ="1", the program continues to the read command sub-routine (RCOMD).

It is to be appreciated that after CPU 16 determines that data register DR contains one byte of data to be read, gate circuits 34 and 36 are disenabled and gate input terminal $\overline{G}$ is enabled so that one byte of data is read from data access lines $\overline{DAL0}$–$\overline{DAL7}$ through bidirectional inverting buffer 24. In the read command sub-routine (RCOMD), CPU 16 enables gate input terminal $\overline{G}$, and disenables gate circuits 34 and 36, to read the byte of data through buffer 24 into register A thereof by the instruction [IN A, (DDATA)]. CPU 16 then loads the data stored in register A into main memory 18 at an address location pointed to by register pair DE by means of a load instruction [LD (DE), A], and then increments the address location stored in register pair (DE) by one by the instruction [INC DE] so as to point to the storage location of the next byte of data.

As previously discussed, when gate input terminal $\overline{G}$ is enabled to transmit the byte of data to register A of the CPU, gate circuits 34 and 36 are disenabled. Thereafter, $\overline{CE}$ becomes "1" and the control signal from decoder 28 corresponding to address 34H becomes "1" so that data access lines DAL0–DAL7 are disenabled, and gate circuits 34 and 36 and gate input terminal $\overline{G}$ are enabled so that status signals IRQ and $\overline{DRQ}$ are transmitted through buffer 24 and are read into the B register of the CPU by the instruction [IN B, (C)]. Thereafter, only the Z flag is tested. In other words, if status signal DRQ="0", this indicates that data register DR does not have a byte of data to be read. Accordingly, the program jumps to the top of the read routine, that is, to sub-routine (INSTS). On the other hand, if status signal DRQ="1", thereby indicating that data register DR includes one byte of data to be read, the program continues to the next step which jumps the program to a location indicated by the (HL) register pair of the Z80A-CPU, that is, the location for the start of the command sub-routine (RCOMD) for reading another byte of data.

It is to be appreciated that the present invention provides distinct advantages over previously known systems. For example, with the present invention, there is no requirement to use an interrupt driven system for floppy disc controller 2 to read status signals IRQ and $\overline{DRQ}$ into CPU 16 for altering an interrupt register therein. It is to be appreciated that such process is relatively long and extremely slow. The present invention overcomes this disadvantage by reading status signals IRQ and $\overline{DRQ}$ directly into the B register of CPU 16 for testing, along data lines $D_7$ and $D_6$, respectively. Accordingly, the speed of transfer of data between floppy disc controller 2 and main memory 18 is greatly increased. In addition, there is no need to utilize a DMA controller having relative complex circuitry to attain such increased speed of transfer.

For example, with previously known systems, data transfer between a floppy disc controller of an eight inch, double-density floppy disc system and microcomputer apparatus is approximately 500 Kbits/sec. Accordingly, one byte of data is transferred in approximately 16 µsec. However, the service time of the MB8876 floppy disc controller is 11.5 µsec. for the write operation and 13.5 µsec. for the read operation. As a result, the floppy disc controller must wait for the CPU. However, with the present invention, as previously described, a status check is performed three times within eleven steps for the read and write routines, that is, with respect to status signal $\overline{DRQ}$. As a result, and because of the status check for status signal IRQ, one byte of data is read from data register DR and stored in main memory 18 within a maximum of 45 cycles. Thus, for example, if the clock frequency of the Z80A-CPU is selected to be at least as high as 4 MHz, one cycle occurs in less than 250 nanosec. In this regard, for 45 cycles, maximum data transfer of one byte is performed in less than 11.25 µsec., which is shorter than the 11.5 µsec. service time period for the write operation of the floppy disc controller and shorter than the 13.5 μsec. service time period for the read operation of the floppy disc controller, whereby data transfer is rapidly and easily performed.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Apparatus for transferring a predetermined number of bits of data in parallel between external memory means including at least one floppy disc drive means and main memory and central processing means of microcomputer means, said apparatus comprising:

external memory control means including floppy disc controller means for interfacing said microcomputer means and said at least one floppy disc drive means, said external memory control means generating at least one status signal;

data bus means extending between said floppy disc controller means of the external memory control means and said main memory and central processing means of the microcomputer means and having a number of data lines equal to said predetermined number of data bits and through which said bits of data may be transmitted in parallel in either direction;

gate means for gating said bits of data in both directions between said microcomputer means and said external memory control means through said data lines of said data bus and for gating the at least one status signal in the direction to said microcomputer means through at least some of the same data lines, said central processing means of the microcomputer means generating at least one command signal in response to the at least one status signal; and gate control means responsive to said at least one command signal for enabling said gate means alternately to gate said at least one status signal through said at least some data lines to said microcomputer means and to gate said bits of data between said microcomputer means and said floppy disc controller means of the external memory control means through all of said data lines.

2. Apparatus according to claim 1; in which said at least one command signal corresponds to at least one command to be executed, and said external memory control means generates an interrupt request status signal which indicates whether said at least one command has been executed and a data request status signal which indicates whether data is ready to be transferred between said external memory control means and said microcomputer means.

3. Apparatus according to claim 2; in which said gate means includes first and second gate circuits for gating said interrupt request status signal and said data request status signal, respectively, to said microcomputer means through said at least some data lines in response to said gate control means.

4. Apparatus according to claim 3; in which said gate means further includes buffer means interposed in data bus means between said external memory control means and said microcomputer means for gating said data between said microcomputer means and said external memory control means through said data lines, and also interposed between said first and second gate circuits and said microcomputer means for gating said interrupt request status signal (IRQ) and said data request status signal through said at least some data lines to said microcomputer means.

5. Apparatus according to claim 4; in which said gate control means includes a decoder means for generating a first control signal in response to said at least one command signal to control transmission of said bits of data between said external memory control means and said microcomputer means through all of said data lines, and a second control signal in response to said at least one command signal to control transmission of said interrupt request status signal and said data request status signal through said at least some data lines to said microcomputer means.

6. Apparatus according to claim 5; in which said gate control means includes a third gate circuit for enabling said buffer means to gate said bits of data between said external memory control means and said microcomputer means through all of said data lines in response to said first control signal, and for enabling said buffer means to gate said interrupt request status signal and said data request status signal through said at least some same lines to said microcomputer means in response to said second control signal.

7. Apparatus according to claim 6; in which said third gate circuit includes a NOR circuit.

8. Apparatus according to claim 6; in which said gate control means includes a fourth gate circuit for enabling said first and second gate circuits to transmit said interrupt request status signal and said data request status signal to said buffer means in response to said second control signal.

9. Apparatus according to claim 8; in which said microcomputer means generates a read enable signal in response to said at least one status signal, and said fourth gate means includes an OR circuit for enabling said first and second gate circuits in response to said read enable signal and said second control signal.

10. Apparatus according to claim 1; in which said central processing means generates said at least one command signal in response to said at least one status signal, said central processing means has I/O port addresses associated therewith, and said external memory control means is assigned to at least one of said I/O port addresses of said central processing means.

* * * * *